United States Patent [19]
Foden et al.

[11] 3,818,048
[45] June 18, 1974

[54] DIHYDROFURAN DERIVATIVES

[75] Inventors: Frederick Roger Foden; Derrick Michael O'Mant, both of Macclesfield, England

[73] Assignee: Imperial Chemical Industries Limited, London, England

[22] Filed: Mar. 20, 1972

[21] Appl. No.: 236,200

[30] Foreign Application Priority Data
Apr. 20, 1971 Great Britain.................... 10038/71

[52] U.S. Cl............... 260/343.6, 424/181, 424/229, 424/232, 424/240, 424/247, 424/259, 424/260, 424/265, 424/266, 424/273, 424/274, 424/279
[51] Int. Cl............................................. C07d 5/06
[58] Field of Search.......................... 260/343.6; 6/2

[56] References Cited
OTHER PUBLICATIONS

Richter, Friedrich. Beilstein Hardbuch Der Organischen Chemie. Band XVIII, 1952, System Nr. 2620, p. 361.
J.A.C.S. 72 1824 (1950).

*Primary Examiner*—Donald G. Daus
*Assistant Examiner*—Anne Marie T. Tighe
*Attorney, Agent, or Firm*—Cushman, Darby & Cushman

[57] ABSTRACT

2-(α-Alkoxycarbonylbenzylidene)-4-phenyl-3-hydroxy-5-oxo-2,5-dihydrofuran derivatives, process for their preparation, and pharmaceutical compositions comprising said dihydrofuran derivatives. Compounds have anti-inflammatory activity.

5 Claims, No Drawings

DIHYDROFURAN DERIVATIVES

This invention relates to new dihydrofuran derivatives which have anti-inflammatory activity.

According to the invention there are provided dihydrofuran derivatives of the formula:

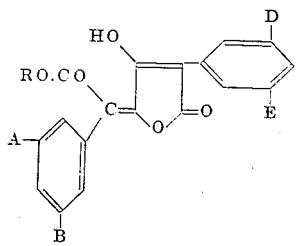

wherein R stands for a $C_{1-3}$ alkyl radical, and either A and B stand for hydrogen atoms and D and E are the same or different and each stands for a fluorine, chlorine, bromine or iodine atom, or D and E stand for hydrogen atoms and A and B are the same or different and each stands for a fluorine, chlorine, bromine or iodine atom.

As one particular embodiment of the invention there may be mentioned, for example, compounds of the formula I wherein A and B stand for hydrogen atoms and D and E stand for chlorine atoms, or A and B stand for chlorine atoms and D and E stand for hydrogen atoms.

A suitable value for R is, for example, a methyl or ethyl radical.

Specific compounds of the invention are, for example, 2-(α-methoxycarbonylbenzylidene)-4-(3,5-dichlorophenyl)-3-hydroxy-5-oxo-2,5-dihydrofuran and 2-(3,5-dichloro-α-methoxy-carbonylbenzylidene)-4-phenyl-3-hydroxy-5-oxo-2,5-dihydrofuran.

According to a further feature of the invention there is provided a process for the preparation of compounds of the formula I, which comprises reacting a compound of the formula:

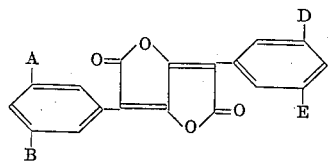

wherein A, B, D and E have the meanings stated above, with an alkanol of the formula ROH wherein R has the meaning stated above.

The said reaction may optionally be carried out in the presence of an alkali metal hydroxide or an alkali metal $C_{1-3}$-alkoxide corresponding to the alkanol ROH, for example, sodium hydroxide, potassium hydroxide or sodium methoxide, or an acid, for example an inorganic acid, for example, hydrochloric acid, or an organic acid. In the case where an alkali metal hydroxide, alkali metal alkoxide or acid is present, the reaction may be carried out at room temperature or at a moderately elevated temperature, for example, at reflux temperature. In the case where an alkali metal hydroxide, alkali metal alkoxide or acid is absent the said reaction is preferably carried out at a moderately elevated temperature, for example at reflux temperature. The above-mentioned process may give a mixture of two products of formula I, depending upon whether one or both of the dihydrofuran rings of the compound of formula II opens or open during the process. The said mixture of products can be separated by physical means, for example, by fractional crystallisation.

The starting materials of formula II are obtainable by the adaptation of a known procedure for the manufacture of 3-(3,4-dimethoxyphenyl)-6-phenyl-2,5-dioxo-2,5-dihydrofuro-[3,2-b]furan.

The anti-inflammatory activity of the dihydrofuran derivatives of formula I has been demonstrated in a well known test involving adjuvant induced arthritis in the rat. The level of activity of the compounds in the test depends upon their precise chemical structure, but generally speaking the said compounds of formula I are active at a dose of 10mg./kg. Moreover, the said compounds have an acceptable therapeutic ratio in the rat.

When one of the said compounds of formula I is used in the treatment of an inflammatory condition in warm-blooded mammals, for example, man, for example, for the treatment of rheumatoid arthritis, it is recommended that it be dosed, for example orally, at a total daily dose of 100 to 2,000mg. per 70kg. bodyweight.

According to a further feature of the invention there are provided pharmaceutical compositions comprising a dihydrofuran derivative of the formula I, wherein R, A, B, D and E have the meanings stated above, and a non-toxic pharmaceutically acceptable diluent or carrier.

The pharmaceutical compositions of the invention may, for example, be in the form of tablets, capsules, suppositories, non-sterile aqueous or non-aqueous solutions or suspensions, sterile injectable aqueous or non-aqueous solutions or suspensions, or creams, lotions or ointments, and they are obtainable by conventional procedures. Preferred compositions are orally administrable dosage unit forms, for example, tablets or capsules, which comprise 5 to 250mg. of said dihydrofuran derivative of formula I.

The pharmaceutical compositions of the invention may optionally contain, in addition to one of the said dihydrofuran derivatives, at least one known agent having anti-inflammatory and/or analgesic activity, for example, aspirin, paracetamol, codeine, chloroquine, phenylbutazone, oxyphenbutazone, indomethacin, mefenamic acid, flufenamic acid, ibufenac, or an anti-inflammatory steroid, for example, prednisolone. Those compositions intended for oral administration may optionally contain, in addition to one of the said dihydrofuran derivatives, at least one known anti-cholinergic agent, for example homatropine methyl bromide, and/or a known antacid, for example, aluminum hydroxide; and/or a known uricosuric agent, for example, probenecid. Those compositions designed for topical application may optionally contain, in addition to one of the said dihydrofuran derivatives, a known vasodilating agent, for example tolazoline, or a known vasoconstricting agent, for example adrenaline; a known local anaesthetic, for example amethocaine, or a known counter-irritant, for example capsicum; and/or at least one known agent chosen from the following classes: antibacterial agents, which include sulphonamides and antibiotics having antibacterial action, for example neomycin; antifungal agents, for example, hydroxyquinoline; antihistaminic agents, for example, promethazine; and rubefacient agents, for example methyl nicotinate.

The invention is illustrated but not limited by the following Example:

EXAMPLE 3-(3,5-Dichlorophenyl)-6-phenyl-2,5-dioxo-2,5-dihydrofuro[3,2-b]furan (10g.) was stirred with methanol (120ml.) and 18N-sodium hydroxide (5ml.). After 15 minutes at room temperature the mixture was diluted with water (100ml.) and acidified to pH 1 with 10N-hydrochloric acid. The resulting precipitate was filtered off, washed with water and methanol, and dried in vacuo. The solid (10.8g.) was dissolved in methanol (2.5 l.) at reflux and cooled to 21°C. The resulting precipitate, which was 2-(α-methoxycarbonylbenzylidene)-4-(3,5-dichlorophenyl)-3-hydroxy-5-oxo-2,5-dihydrofuran, m.p. 180°-181°C., was filtered off and the mother liquors were chilled over 1 hour to 12°C. There was a further precipitate, which was 2-(3,5-dichloro-α-methoxycarbonylbenzylidene)-4-phenyl-3-hydroxy-5-oxo-2,5-dihydrofuran, m.p.196°-198°C.

The starting material was prepared from 3,5-dichlorobenzyl cyanide by the adaptation of the known method for preparing 3-(3,4-dimethoxyphenyl)-6-phenyl-2,5-dioxo-2,5-dihydrofuro[3,2-b]furan.

What we claim is:

1. A compound selected from the group consisting of dihydrofuran derivatives of the formulae:

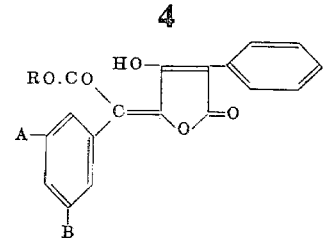

Ia and

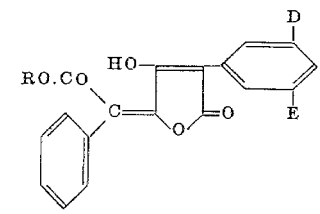

Ib wherein R stands for alkyl of up to three carbon atoms, and A, B, D and E are members selected from the group consisting of fluorine, chlorine, bromine and iodine atoms.

2. Compound of the formula Ia as claimed in claim 1 wherein A and B stand for a chlorine atom.

3. Compound of the formula Ib as claimed in claim 1 wherein D and E stand for a chlorine atom.

4. A compound as claimed in claim 1 which is 2-(α-methoxycarbonylbenzylidene)-4-(3,5-dichlorphenyl)-3-hydroxy-5-oxo-2,5-dihydrofuran.

5. A compound as claimed in claim 1 which is 2-(3,5-dichloro-α-methoxycarbonylbenzylidene)-4-phenyl-3-hydroxy-5-oxo-2,5-dihydrofuran.

* * * * *